United States Patent [19]

Nishimatsu et al.

[11] Patent Number: 4,946,729
[45] Date of Patent: Aug. 7, 1990

[54] RESIN COMPOSITION AND MAGNETIC RECORDING MEDIUM EMPLOYING THE COMPOSITION

[75] Inventors: Masaharu Nishimatsu, Komoro; Shigeru Shimada, Saku; Toshiaki Ide, Saku; Hiroyuki Arioka, Saku; Yuichi Kubota, Komoro, all of Japan

[73] Assignee: TDK Corporation, Tokyo, Japan

[21] Appl. No.: 654,364

[22] Filed: Sep. 26, 1984

[30] Foreign Application Priority Data

Oct. 5, 1983 [JP] Japan .................. 58-185027

[51] Int. Cl.$^5$ .............................................. G11B 23/00
[52] U.S. Cl. .................................... 428/141; 427/44; 428/323; 428/425.9; 428/694; 428/900
[58] Field of Search ........... 428/425.9, 694, 900, 428/141, 323; 427/44

[56] References Cited

U.S. PATENT DOCUMENTS

| | | | |
|---|---|---|---|
| 4,004,997 | 1/1977 | Tsukamoto | 428/900 |
| 4,161,471 | 7/1979 | Kassal. | |
| 4,328,935 | 5/1982 | Steel | 428/329 |
| 4,343,831 | 8/1982 | Tsuji | 427/128 |
| 4,407,853 | 10/1983 | Okita | 427/128 |
| 4,415,630 | 11/1983 | Kubota | 428/694 |
| 4,419,406 | 12/1983 | Isobe | 427/44 |
| 4,448,848 | 5/1984 | Okita | 427/128 |
| 4,451,531 | 5/1984 | Isobe | 427/44 |
| 4,452,863 | 6/1984 | Takizawa | 428/900 |
| 4,482,610 | 11/1984 | Okita | 427/44 |
| 4,486,500 | 12/1984 | Naruo | 427/44 |

OTHER PUBLICATIONS

Guruswamy, S., "Radiation Curing of Organic Coatings", *Metal Finishing*, Jul. 1978, pp. 25-30.

*Primary Examiner*—Paul J. Thibodeau
*Attorney, Agent, or Firm*—Oblon, Spivak, McClelland, Maier & Neustadt

[57] ABSTRACT

A back coating resin composition for a magnetic recording medium comprising:

(A) a plastic compound having a molecular weight of from 5,000 to 100,000 and containing at least two radiation-curable unsaturated double bonds;
(B) a rubber-like compound having a molecular weight of from 3,000 to 100,000 and containing at least one radiation-curable unsaturated double bond or containing no such double bond; and
(C) a compound having a molecular weight of from 200 to 3,000 and containing at least one radiation-curable unsaturated double bond.

1 Claim, 1 Drawing Sheet

RESIN COMPOSITION AND MAGNETIC RECORDING MEDIUM EMPLOYING THE COMPOSITION

The present invention relates to a back coating resin composition for a magnetic recording medium and to a magnetic recording medium wherein the resin composition is used as a binder for the back coating layer.

Various magnetic recording media such as a cassette tape, an open reel tape, a video tape, a magnetic card and a magnetic disc, are prepared by applying a coating agent such as a coating material or a printing ink (hereinafter a coating material will be referred to for the convenience of description) containing a magnetizable metal or metal oxide such as iron oxide on a substrate film of polyester, polyvinyl chloride, polyacetate or drying and, if necessary, curing. It is common to use as a resin coating binder (a binding agent) a vinyl chloride copolymer, a polyurethane, a polyacrylate or, in some cases, an epoxy resin. A plasticizer, a rubber, a dispersant, an antistatic agent or a pigment may optionally be added as the case requires.

In a recording system presently available in which a magnetic head is employed, a spacing loss between the tape and the head is represented by $54.6 \, d/\lambda [dB]$ where $d$ is a distance between the tape and the head, and $\lambda$ is a recording wavelength. As is evident from this formula, in a short wave recording system having a high recording density which has been highly in demand recent years for the reason of e.g. abundant information to be recorded, the rate of the decrease in the output attributable to the spacing is extremely great as compared with the long wave recording system. Accordingly, even a fine foreign matter deposited on the tape surface is likely to lead to an error in detecting a pulse which should be detected at the time of reading out the information written in the magnetic recording medium and thus is likely to be detected as a dropout. As the causes for the foreign matters attributable to the dropouts, there may be mentioned magnetic powder fallen off from the magnetic layer of the magnetic recording tape as a result of a deterioration of the magnetic layer due to the repeated exertion of stress, or particles abraded off from the substrate during the tape running or dusts which are electrostatically deposited on the substrate surface and then transferred to the magnetic layer surface. In order to prevent the deposition of foreign matters, there have been proposed a method wherein a coating composition prepared by kneading an inorganic filler such as carbon black or graphite with an organic binder, is coated on the rear side of the substrate opposite to the magnetic layer side of the magnetic recording tape, to provide an antistatic property, or a method wherein the abrasion of the substrate is minimized. Further, in the case where the magnetic layer is made of a thin metal film, the magnetic recording medium tends to curl since the magnetic layer is thin. The backing layer plays an important role also for the prevention of such curling. By these treatments, the tendency for the increase of the dropouts by the repeated running operation can substantially be controlled. However, the level of the control is not yet adequate, and the dropouts are required to be further reduced For the purpose of further reducing dropouts, the causes for the dropouts have been investigated in detail, and as a result, the following fact has been found. In order to prevent an increase of dropouts even when the number of running operations is increased, the back coating layer is required to be tough. Therefore, a thermosetting resin is usually preferably used as the binder. In such a case, it takes a long time for the curing of a thermosetting resin, and therefore it is usual that after the application of the back coating layer, the tape is first wound up and then subjected to thermosetting treatment. However, at the time when the application of the back coating layer has been completed, the thermosetting reaction has not yet started in the back coating layer, and the coating layer is still weak Besides, the back coating surface is in close contact with the magnetic layer surface in the rolled tape. Therefore, the coating surface of the back coating layer containing carbon black, graphite or other inorganic fillers is likely to be transferred to the opposite magnetic layer surface with which the back coating layer surface is in contact, and the transferred substance causes dropouts or clogging of the head. This phenomenon is considered to be likely to occur also in the case of a thermoplastic resin. This is the reason why the dropouts can not be reduced adequately at the initial stage where the number of running operations is small, although it is thereby possible to minimize the increase of the dropouts due to the repeated running operations.

In order to solve the above-mentioned drawbacks in the process for the formation of the back coating layer, the present inventors have earlier proposed a method wherein a back coating layer is formed with a coating composition prepared by kneading a radiation sensitive resin (a radiation curable resin) as a binder with an inorganic filler, and then a radiation is applied thereto from an active energy ray source for curing treatment, or the back coating layer is subjected to surface treatment and then to curing treatment, to create three dimensional cross linking in the back coating layer and form a tough coating layer, and the tape thus formed is wound up, whereby dropouts attributable to the above-mentioned causes can be reduced (Japanese Unexamined Patent Publication No. 169929/1982). According to this method, the winding up of the tape is subsequent to the completion of the cross linking reaction of the coating layer, whereby no transfer of the inorganic filler particles from the back coating layer to the magnetic layer takes place even when the back coating layer is brought in close contact with the magnetic layer by the winding up operation. The radiation sensitive resin used in this method is the one which contains, in its molecular chain, at least two unsaturated double bonds capable of generating radicals when irradiated and forming a cross linking structure. Specifically, there may be employed (A) a thermoplastic resin modified with e.g. acrylic acid and having a molecular weight of a level of from 8,000 to 25,000, alone or in combination with (B) a polyurethane elastomer having a molecular weight of a level of from 2,000 to 3,000. When the former modified thermoplastic resin is used alone, the adhesion of the back coating layer to the substrate and the flexibility are inferior. Also in the case where the elastomer is used together, it has a low molecular weight, and the flexibility is poor, and the coating layer tends to be brittle, whereby the abrasion of the back coating layer is likely to result during the running operation, and when the running tape is stopped abruptly, the abrasion of the back coating surface is likely to result since the difference between the static friction and the dynamic friction is great. To solve this drawback, the present inventors have also proposed a method for a combination of compound (A) having a molecular weight of from 30,000 to 100,000 and a compound (B) having a molecular weight of 3,500 to 150,000. From a further research, it has been found that such a combination has a problem to some extent in that when kept under a high temperature condition e.g. at 50° C., at a relative humidity of 80% for 5 hours, it tends to have adhesiveness, the frictional coefficient becomes high, an image distortion is likely to result, and the static friction tends to be high. It is considered that one of the factors for such a problem is that the back coating layer having a composition of (A) and (B) has a low degree of curing. The present inventors have conducted extensive researches to solve this problem, and have found that it is possible to increase the curing degree of the back coating layer and to solve the problem of the adhesiveness by introducing a low molecular weight component as a component (C).

Namely, it has been found possible to obtain a magnetic recording medium wherein the breaking strength of the coating layer is increased, the coating layer is strengthened, the abrasion of the back coating is reduced, dropouts are minimized since there is no transfer of the inorganic filler particles from the back coating layer to the magnetic layer, and there is no tightening of the tape winding at the time of the curing in a rolled form, and the required characteristics are uniform in the longitudinal direction, by employing a combination of compounds having specific molecular weight ranges as radiation sensitive resins, i.e. (A) a plastic compound having a molecular weight of from 5,000 to 100,000, preferably from 10,000 to 80,000, more preferably from 20,000 to 80,000, and containing at least two radiation-curable unsaturated double bonds, (B) a rubber-like compound having a molecular weight of from 3,000 to 100,000, preferably from 3,500 to 80,000, and containing at least one radiation curable unsaturated double bond or containing no such double bond, and (C) a compound having a molecular weight of from 200 to 3,000, preferably from 200 to 2,500, and containing at least one radiation curable unsaturated double bond. The present invention has been accomplished based on this discovery.

Thus, the present invention provides a back coating resin composition for a magnetic recording medium comprising:

(A) a plastic compound having a molecular weight of from 5,000 to 100,000 and containing at least two radiation-curable unsaturated double bonds;

(B) a rubber-like compound having a molecular weight of from 3,000 to 100,000 and containing at least one radiation-curable unsaturated double bond or containing no such double bond; and (C) a compound having a molecular weight of from 200 to 3,000 and containing at least one radiation-curable unsaturated double bond Further, the present invention also provides a magnetic recording medium comprising a substrate, a magnetic recording layer formed on one side of the substrate and a back coating layer formed on the other side of the substrate, characterized in that the binder of the back coating layer is a radiation-curable resin composition comprising:

(A) a plastic compound having a molecular weight of from 5,000 to 100,000 and containing at least two radiation-curable unsaturated double bonds;

(B) a rubber-like compound having a molecular weight of from 3,000 to 100,000 and containing at least one radiation-curable unsaturated double bond or containing no such double bond; and (C) a compound having a molecular weight of from 200 to 3,000 and containing at least one radiation-curable unsaturated double bond.

Now, the present invention will be described in detail with reference to preferred embodiments.

In the accompany drawings.

Figure 1:
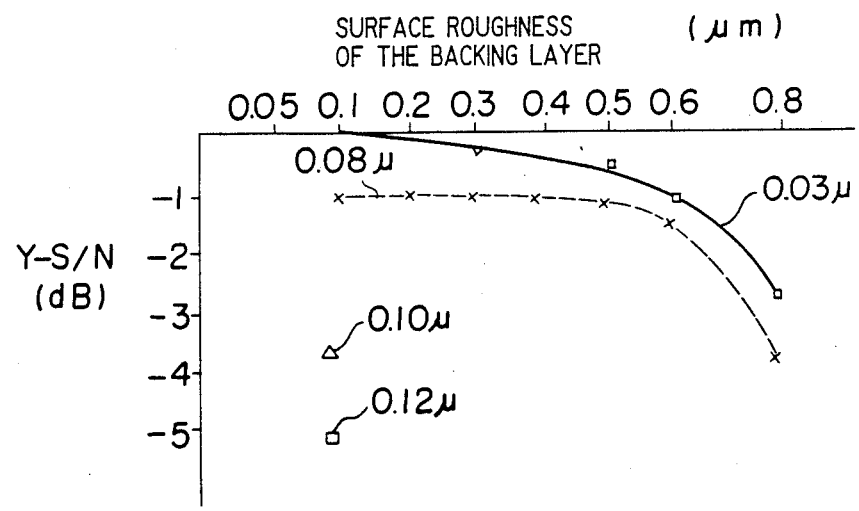
FIG. 1 is a graph showing the relation between the surface roughness of the magnetic layer and the back coating layer of a magnetic recording medium and the S/N ratio.

If the compound (A) is employed alone, no adequate flexibility is obtainable, and the coating layer will be brittle. If the compound (B) is used alone, the coating layer lacks in the elasticity. By the combination of the compounds (A) and (B), it is possible to increase the breaking energy, but the brittleness energy can not adequately be increased. Further, when kept under a high temperature high humidity condition, the combination of compounds (A) and (B) tends to be adhesive and the static friction increases probably because the hardness is not adequate. Whereas, when the compounds (A) and (B) are combined with the compound (C), the degree of the cross linking increases, the tensile strength of the binder increases, the breaking energy and the brittleness energy increase, no abrasion of the back coating takes place, and a tough coating layer having high hardness is obtainable. Even when kept under a high temperature and high humidity condition at 50° C. under a relative humidity of 80% for 5 days, no adhesiveness will results, the frictional coefficient is low and no image distortion results. This is attributable to the fact that by the addition of the compound (C), the degree of the cross linking of the back coating layer increases and the degree of the hardness increases. When the compounds (A) and (B) are combined with the compound (C), the component (A) may have a lower-molecular weight than the component (A) in the combination of the compounds (A) and (B) alone. Namely, by the incorporation of the component (C), the plasticity of the plastic compound (A) is improved and the degree of hardness is improved, whereby a highly elastic coating layer having a great brittleness energy is obtainable.

In the resin composition, if the compound (A) has a molecular weight of less than 5,000 or if the compound (B) has a molecular weight of less than 3,500, the coating layer tends to be too hard, and the back coating tends to be susceptible to abrasion, and the electromagnetic conversion characteristics tend to be poor[On the other hand, if the molecular weight of the compound (B) exceeds 100,000, the dispersibility tends to be poor, whereby the electromagnetic conversion characteristics will be inferior, and in the case where the compound (B) is radiation curable, the radiation curable property tend to be poor and the strength will be reduced. With respect to the compound (C), if the molecular weight exceeds 3,000, the cross linking property tends to be poor, and the strength of the coating layer will be low. Preferred molecular weight ranges are from 10,000 to 80,000 for the compound (A), from 3,000 to 80,000 for the compound (B) and from 200 to 2,500 for the compound (C). As the compound (B), a radiation curable compound is preferred since it is thereby possible to improve the cross linking property and the strength of the coating layer.

With respect to the proportions of the compounds (A), (B) and (C), it is preferred that the resin composition comprises from 20 to 70% by weight, preferably from 30 to 0% by weight, of the compound (A), from 20 to 80% by weight, preferably from 20 to 60% by weight, of compound (B) and from 10 to 40% by weight, preferably from 10 to 30% by weight, of the compound (C).

The molecular weights of the compounds (A), (B) and (C) of the present invention are number average molecular weights obtained by the following measuring method.

Measurement of an Average Molecular Weight of a Binder by GPC

GPC (Gel Permeation Chromatography) is a method of separating molecules in a test sample depending upon their sizes in a mobile phase, wherein a porous gel functioning as a molecular sieve is filled in a column whereby liquid chromatography is conducted. For the calculation of an average molecular weight, a polystyrene having a known molecular weight is used as a standard sample, and a calibration curve is prepared based on its eluting time. An average molecular weight calculated as polystyrene is thereby obtained.

$$Mn = \frac{\Sigma NiMi}{Ni}$$

where Mn is a number average molecular weight, and Ni is a number of molecules having a molecular weight of Mi in a given polymer substance.

In the compounds (A), (B) and (C) of the present invention, the number of unsaturated double bonds per molecule is at least 2, preferably at least 5 in the case of the compound (A), at least 1, preferably at least 5 in the case of the compound (B), and at least 1, preferably at least 3, in the case of the compound (C).

The plastic compound (A) to be used in the present invention is the one containing at least two unsaturated double bonds in its molecular chain, which are capable of generating radicals when irradiated and forming a cross linking structure. Such a compound may also be obtained by modifying a thermoplastic resin to convert it to a radiation sensitive resin.

As a specific example of the radiation curable resin, there may be mentioned a thermoplastic resin containing or having incorporated in its molecule radiation cross linkable or polymerizable groups such as acrylic double bonds of acrylic acid, methacrylic acid or their ester compounds having radical polymerizable unsaturated double bonds, allyl-type double bonds of e.g. diallylphthalate, or unsaturated double bonds of e.g. maleic acid or maleic acid derivatives, or other compounds containing radiation cross linkable or polymerizable unsaturated double bonds, and having a molecular weight of from 5,000 to 100,000, preferably from 10,000 to 80,000.

As resins containing radiation cross linkable or polymerizable groups in the molecule of a thermoplastic resin, there may be mentioned the following unsaturated polyester resin.

Namely, there may be mentioned a polyester compound containing radiation curable unsaturated double bonds in its molecular chain, such as an unsaturated polyester resin containing radiation curable unsaturated double bonds, which is prepared by substituting maleic acid for a part of polybasic acids in a saturated polyester resin comprising an ester bond of a polybasic acid with a polyhydric alcohol, as mentioned in the following item (2). A radiation curable unsaturated polyester resin may be prepared by a conventional method by an addition of e.g. maleic acid or fumaric acid to at least one polybasic acid component and at least one polyhydric alcohol component, i.e. by subjecting the mixture to a dehydration or alcohol removal reaction in the presence of a catalyst at a temperature of from 180° to 200° C. in a nitrogen atmosphere, then raising the temperature to from 240° to 280° C. and conducting a condensation reaction under a reduced pressure of from 0.5 to 1 mmHg. The content of maleic acid or fumaric acid is from 1 to 40 mol%, preferably from 10 to 30 mol% in the acid component, in view of the cross linking at the time of the production and the radiation curable property.

Examples of the thermoplastic resins which can be modified to radiation curable resins, include the following resins.

(1) Vinyl chloride type copolymers:

There may be mentioned a vinyl chloride-vinyl acetate-vinyl alcohol copolymer, a vinyl chloride-vinyl alcohol copolymer, a vinyl chloride-vinyl alcohol-vinyl propionate copolymer, a vinyl chloride-vinyl acetate-maleic acid copolymer, a vinyl chloride-vinyl acetate-OH-terminated side chain alkyl group copolymer, such as VROH, VYNC, VYBGX, VERR, VYES, VMCA or VAGH manufactured by UCC (Union Carbide Corporation, U.S.A.).

These copolymers can be modified to radiation-sensitive resins by introducing into them acrylic double bonds, maleic double bonds or allyl-type double bonds by the process described later.

(2) Saturated polyester resins:

There may be mentioned saturated polyester resins obtained by the esterification of saturated polybasic acids such as phthalic acid, isophthalic acid, terephthalic acid, succinic acid, adipic acid or sebacic acid, with polyhydric alcohols such as ethylene glycol, diethylene glycol, glycerol, trimethylol propane, 1,2-propylene glycol, 1,3-butanediol, dipropylene glycol, 1,4-butanediol, 1,6-hexanediol, pentaerythritol, sorbitol, glycerin, neopentyl glycol or 1,4-cyclohexane dimethanol, and resins obtained by the modification of these polyester resins with e.g. $SO_3Na$ (e.g. Vylon 53S).

These resins can be modified to radiation-sensitive resins by the process mentioned hereinafter.

(3) Polyvinyl alcohol type resins:

There may be mentioned polyvinyl alcohol, butyral resins, acetal resins, formal resins, and copolymers of these components.

The hydroxyl groups contained in these resins can be modified to be radiation-sensitive by the process described hereinafter.

(4) Epoxy type resins and phenoxy resins:

There may be mentioned epoxy resins obtained by the reaction of bisphenol A with epichlorohydrin, methylepichlorohydrin or the like, such as EPIKOTE 152, 154, 828, 1001, 1004 and 1007 (manufactured by Shell Chemical Company); DEN431, DER732, DER511 and DER331 (manufactured by Dow Chemical Company); EPICLON-400 and EPICLON-800 (manufactured by Dai-Nippon Ink K. K.); phenoxy resins such as PKHA, PKHC and PKHH which are the highly polymerized resins among the above-mentioned epoxy resins, and are manufactured by Union Carbide Corporation; and copolymers of brominated bisphenol A with epichlorohydrin, such as EPICLON 145, 152, 153 and 1120 (manufactured by Dai-Nippon Ink & Chemicals Co.) and others.

The radiation-sensitive modification is effected by utilization of the epoxy groups contained in these resins.

(5) Cellulose derivatives:

Various types of cellulose derivatives may be employed. Particularly effective and preferable among them are nitrocellulose, cellulose aceto-butyrate, ethylcellulose, butyl-cellulose, acetyl-cellulose, and so forth.

These cellulose derivatives are modified to radiation-sensitive resins by activating the hydroxyl groups in the resins by the process mentioned hereinafter.

Besides the above, the resins which may also be used effectively for the radiation-sensitive modification are polyfunctional polyester resins, polyether ester resins, polyvinyl pyrrolidone resins and derivatives thereof (e.g., PVP olefin copolymers), polyamide resins, polyimide resins, phenol resins, spiro-acetal resins, acrylic resins containing therein at least one acrylic or methacrylic acid ester having a hydroxyl group as the polymerization component, and the like.

The high molecular weight compound (B) of the present invention is a thermoplastic elastomer or prepolymer, or such elastomer or prepolymer modified to be radiation-sensitive. The latter is particularly effective.

In the following, there will be given examples of the elastomers and prepolymers.

(1) Polyurethane elastomers or prepolymers:

The use of polyurethanes is particularly effective in that their abrasion resistance and adhesion to base films such as PET films are satisfactory.

Examples of such effective urethane compounds are: polyurethane elastomers or prepolymers which are composed of polycondensates of various polyhydric isocyanates, as the isocyanate components, such as 2,4-toluene diisocyanate, 2,6-toluene diisocyanate, 1,3-xylene diisocyanate, 1,4-xylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylbiphenylene diisocyanate, 4,4'-biphenylene diisocyanate, hexamethylene diisocyanate, isophorone diisocyanate, dicyclohexylmethane diisocyanate, Desmodule L, Desmodule N, and so on; with various polyesters such as linear saturated polyesters (e.g. those obtained by polycondensation of polyhydric alcohols such as ethylene glycol, diethylene glycol, glycerin, trimethylolpropane, 1,4-butanediol, 1,6-hexanediol, pentaerythritol, sorbitol, neopentyl glycol, 1,4-cyclohexane dimethanol, and so forth with saturated polybasic acids such as phthalic acid, isophthalic acid, terephthalic acid, succinic acid, adipic acid, sebacic acid, and so forth), linear saturated polyethers (e.g. polyethylene glycol, polypropylene glycol, polytetramethylene glycol, and so forth) as well as caprolactam, hydroxyl-containing acrylic acid esters, hydroxyl-containing methacrylic acid esters, and so forth.

It is highly effective to react a monomer having an acrylic double bond, an allyl-type double bond, or the like with the terminal isocyanate group or hydroxyl group of these urethane elastomers, to thereby modify them to be radiation-sensitive.

(2) Elastomers of acrylonitrile-butadiene copolymers:

Prepolymers of acrylonitrile-butadiene copolymers containing therein terminal hydroxyl groups,, such as "Poly BD Liquid Resin" produced by Sinclair Petrochemicals Corp. and available in general market, or elastomers such as "Hycar 1432J" manufactured by Japanese Zeon K. K., and so forth are particularly suitable as the elastomeric components, with which the double bonds in butadiene produce radicals by the radiation rays to cause cross-linking and polymerization.

(3) Polybutadiene elastomers:

Low molecular weight prepolymers having the terminal hydroxyl groups, such as "Poly BD Liquid Resin R-15", manufactured by Sinclair Petrochemicals Corp., are particularly suitable in respect of their compatibility with thermoplastic resins. In the "R-15" prepolymer, since the terminal end of the molecule is occupied by the hydroxyl group, it is possible to enhance the radiation sensitivity by adding an acrylic unsaturated double bond to the terminal end of the molecule, whereby the prepolymer becomes much more advantageous as the binder.

Further, cyclized products of polybutadiene such as "CBR-M901" manufactured by Japan Synthetic Rubber Co., also exhibit excellent properties when combined with the thermoplastic resins.

Further, suitable among other thermoplastic elastomers and their prepolymers are: styrene-butadiene rubbers, chlorinated rubbers, acrylic rubbers, isoprene rubbers and their cyclized products (e.g. "CIR701", manufactured by Japan Synthetic Rubber K. K.), and elastomers such as epoxy-modified rubbers, or internally plasticized saturated linear polyesters (e.g. "Vylon #300", a product of Toyo Spinning K. K.). These may also be used effectively by subjecting them to the modifying treatment for the radiation-sensitization described hereinbelow.

As the compound (C) having radiation curable unsaturated double bonds to be used in the present invention, there may be mentioned styrene, ethyl acrylate, ethylene glycol diacrylate, ethylene glycol dimethacrylate, diethylene glycol diacrylate, diethylene glycol dimethacrylate, 1,6-hexane glycol diacrylate, 1,6-hexane glycol dimethacrylate, trimethylolpropane triacrylate, trimethylolpropane trimethacrylate, a polyfunctional oligo ester acrylate (e.g. Acronix M-7100, manufactured by Toa Gosei K. K.), an acryl-modified product of urethane elastomer (Nippolan 4040) or these compounds to which functional groups such as a COOH group are introduced.

Now, examples for the syntheses of the radiationsensitive binders will be given.

(a) Synthesis of an acryl-modified product of a vinyl chloride-vinyl acetate copolymer type resin (radiation-sensitive modified resin):

750 Parts by weight of a partially saponified vinyl chloride-vinyl acetate copolymer having OH groups (average polymerization degree: n=500), 1250 parts by weight of toluene, and 500 parts by weight of cyclohexanone were charged into a four-necked flask of a 5-liter capacity and dissolved under heating. After raising the temperature to 80° C., 61.4 parts by weight of 2-hydroxyethyl methacrylate adduct of tolylene diisocyanate was added. Further, 0.012 part by weight of tin octylate and 0.012 part by weight of hydroquinone were added, and the reaction was carried out at a temperature of 80° C. in a nitrogen (N₂) stream until the conversion of NCO reached 90%. After completion of the reaction, the reaction system was cooled and diluted by addition of 1250 parts by weight of methyl ethyl ketone.

Production of 2-hydroxyethyl methacrylate (2HEMA) adduct of tolylene diisocyanate (TDI):

348 Parts by weight of tolylene diisocyanate (TDI) was heated to a temperature of 80° C. in a four-necked flask of one-liter capacity in a nitrogen ($N_2$) stream. Thereafter, 260 parts by weight of 2-hexamethylene methacrylate, 0.07 part by weight of tin octylate, and 0.05 part by weight of hydroquinone were added dropwise into a reaction vessel, while cooling to control the temperature inside the reaction vessel to be in a range of from 80° to 85° C. After completion of the dropwise addition, the mixture was stirred for three hours at 80° C. to complete the reaction. After completion of the reaction, the reaction product was taken out of the reaction vessel and cooled to obtain 2-hydroxyethyl methacrylate (2HEMA) adduct of tolylene diisocyanate (TDI) as a white paste.

(b) Synthesis of an acryl-modified product of a butyral resin (radiation-sensitive modified resin)

100 Parts by weight of a butyral resin, "BM-S" produced by Sekisui Chemical Co., was charged into a four-necked flask of a 5-liter capacity, together with 191.2 parts by weight of toluene and 71.4 parts by weight of cyclohexanone, and dissolved under heating. After raising the temperature to 80° C., 7.4 parts by weight of the 2-hydroxyethyl methacrylate adduct of tolylene diisocyanate was added to the solution, followed by further addition of 0.015 part by weight of tin octylate and 0.015 part by weight of hydroquinone. Then, the reaction was carried out at 80° C. in a nitrogen ($N_2$) stream until the conversion of NCO reached at least 90%. After completion of the reaction, the reaction product was cooled and diluted with methyl ethyl ketone.

(c) Synthesis of an acryl-modified product of a saturated polyester resin (radiation-sensitive modified resin)

100 Parts by weight of a saturated polyester resin "Vylon RV-200" manufactured by Toyo Spinning Co., was dissolved under heating in 116 parts by weight of toluene and 116 parts by weight of methyl ethyl ketone. After raising the temperature to 80° C., 3.55 parts by weight of the 2HEMA adduct of TDI was added, followed by further addition of 0.007 part by weight of tin octylate and 0.007 part by weight of hydroquinone. Then, the reaction was carried out at 80° C. in a nitrogen ($N_2$) stream until the conversion of NCO reached at least 90%.

(d) Synthesis of an acryl-modified product of an epoxy resin (radiation-sensitive modified resin)

400 Parts by weight of an epoxy resin "Epikote 1007" manufactured by Shell Chemical Co., was dissolved under heating in 50 parts by weight of toluene and 50 parts by weight of methyl ethyl ketone. Thereafter, 0.006 part by weight of N,N-dimethylbenzylamine and 0.003 part by weight of hydroquinone were added to the solution, and the temperature was raised to 80° C. Then, 69 parts by weight of acrylic acid was added dropwise, and the reaction was carried out at 80° C. until the acid value became 5 or lower.

Synthesis of an acryl-modified product of a phenoxy resin (radiation sensitive modified resin)

600 Parts by of a phenoxy resin having OH groups (PKHH, ma by U.C.C., the molecular weight of 30,000 an parts by weight of methyl ethyl ketone introduced in a 3 liter four-necked flask, heated and dissolved. After raising the temperature to 80° C., 6.0 parts by weight of a 2-hydroxyethyl .late adduct of tolylene diisocyanate was added, and further 0.012 part by weight of tin octylate, and 0.012 part by weight of hydroquinone were added. The mixture was reacted at 80° C. in a nitrogen stream the conversion of NCO reached 90%. The modified resin had a molecular weight of 35,000, and the of double bonds per molecule was 1.

(e) Synthesis of acryl-modified product of a urethane elastomer (radiation-sensitive elastomer)

250 Parts by of an isocyanate-terminated diphenylmethane diisocyanate (MDI) type urethane prepolymer, "Ni 3119", manufactured by Nippon Polyurethane Co., 32.5 parts by weight of 2HEMA, 0.07 part by of hydroquinone, and 0.009 part by weight of tin were charged into a reaction vessel, and dissolved under heating at 80° C. Then, 43.5 parts by weight of TDI was added dropwise into the reaction vessel cooling to control the temperature inside of the vessel to be in a range of from 80 to 90° C. After completion of the dropwise addition, the reaction was conducted at 80° C. until the conversion of NCO reached at least 95%.

(f) Synthesis of an acryl-modified product of a polyether type terminal urethane-modified elastomer (radiation-sensitive elastomer)

250 Parts by weight of a polyether, "PTG-500" manufactured by Nippon Polyurethane Industry, 32.5 parts by weight of 2HEMA, 0.007 part by weight of hydroquinone, and 0.009 part by weight of tin octylate were charged into a reaction vessel, and dissolved under heating at 80° C. Then, 43.5 parts by weight of TDI was added dropwise into the reaction vessel, while cooling to control the temperature inside of the reaction vessel to be in a range of from 80° to 90° C. After completion of the dropwise addition, the reaction was conducted at 80° C. until the conversion of NCO reached at least 95%.

(g) Synthesis of an acryl-modified product of a polybutadiene elastomer (radiation-sensitive elastomer)

250 Parts by weight of a low molecular weight hydroxyl-terminated polybutadiene, "Poly-BD-Liquid Resin R-15" manufactured by Sinclair Petrochemicals, Inc., 32.5 parts by weight of 2HEMA, 0.007 part by weight of hydroquinone, 0.009 part by weight of tin octylate were charged into a reaction vessel, and dissolved under heating at 80° C. Then, 43.5 parts by weight of TDI was added dropwise, while cooling to control the temperature inside the reaction vessel to be in a range of from 80 to 90° C. After completion of the dropwise addition, the reaction was conducted at 80° C. until the conversion of NCO reached at least 95%.

Among high-polymer substances, there have been known those which undergo decomposition when irradiated with radiation rays and those which undergo cross-linking among the molecules by the irradiation wi&h radiation rays. Those which undergo cross-linking among the molecules include polyethylene, polypropylene, polystyrene, polyacrylic acid ester, polyacrylamide, polyvinyl chloride, polyester, polyvinyl pyrrolidone rubbers, polyvinyl alcohol and polyacrolein. Such cross-linking type polymers can be used, n addition to the above modified products, as radiation curable coating resins for the backing layer, as they are, i.e. without subjecting them to any particular modifying treatment as mentioned above, since they undergo a cross-linking reaction without such treatment.

Furthermore, according to this method, even a non-solvent type resin can effectively used for the back coating, since it can be cured in a short period of time without requiring any solvent.

In a particularly preferred combination for the radiation curable resin composition of the present invention, the compound (A) is a compound obtained by reacting an isocyanate group-containing compound obtained by the reaction of a polyisocyanate compound with a partially saponified vinyl chloride-vinyl acetate copolymer, a carboxylic acid-introduced vinyl chloridevinyl acetate copolymer or a phenoxy resin, with an acrylic or methacrylic compound having a functional group reactive with the isocyanate group; the compound (B) is an isocyanate compound obtained by reacting a polyol with an isocyanate compound, or a compound obtained by reacting a polyol (polyurethane elastomer) with an acrylic or methacrylic compound having a reactive functional group; and the compound (C) is a polyfunctional (meth)acrylate monomer, an oligoester acrylate or a low molecular weight compound of (B).

To the back coating resin composition of the present invention, there may be added a filler, a dispersant, a lubricant, an antistatic agent, etc.

As the filler, there may be mentioned (1) electroconductive carbon black or graphite, or (2) an inorganic filler such as $SiO_2$, $TiO_2$, $Al_2O_3$, $Cr_2O_3$, SiC, CaO, $CaCO_3$, zinc oxide, Geothite, $\alpha$-$Fe_2O_3$, talc, kaolin, $CaSO_4$, boron nitride, fluorinated graphite or molybdenum disulfide. Among them, $CaCO_3$ and carbon are preferably used. The amount of such a filler is from 20 to 200 parts by weight relative to 100 parts by weight of the binder in the case of the filler (1), or from 10 to 300 par&s by weight relative to 100 parts by weight of the binder in the case of the filler (2). If the amount of the filler is excessive, the coating layer tends to be brittle, and thus is likely to increase dropouts. The average particle size of the filler (1) or (2) is preferably from 10 to 500 m$\mu$m.

As the dispersant and lubricant, there may be used any types which have been commonly used for the back coating layers of this type. For instance, there may be employed a fatty acid having at least 12 carbon atoms (RCOOH where R is an alkyl group having at least 11 carbon atoms) such as capric acid, caprylic acid, lauric acid, myristic acid, palmitic acid, stearic acid, behenic acid, oleic acid, elaidic acid, linoleic acid, linolenic acid or stearolic acid; a metal salt of the above fatty acid such as an alkali metal salt (Li, Na, K, etc.) or an alkaline earth metal salt (Mg, Ca, Ba, etc.); or lecithin. It is also possible to use a higher alcohol having at least 12 carbon atoms or its sulfuric acid ester, or a surfactant, a titanium coupling agent or a silane coupling agent. Such a dispersant is used in an amount of from 1 to 20 parts by weight relative to 100 parts by weight of the binder.

As the lubricant, there may be used, in addition to the above-mentioned lubricants, silicone oil, graphite, molybdenum disulfide, tungsten disulfide, a fatty acid ester prepared from a monobasic fatty acid having from 12 to 16 carbon atoms and a monohydric alcohol having from 3 to 12 carbon atoms, or a fatty acid ester prepared from a monobasic fatty acid having at least 17 carbon atoms and a monohydric alcohol having a total of from 21 to 23 carbon atoms including the number of carbon atoms of the fatty acid. Such a lubricant is added in an amount of from 0.2 to 20 parts by weight relative to 100 parts by weight of the binder.

As the antistatic agent, there may be used a natural surfactant such as saponin, nonionic surfactant such as an alkylene oxide- type, glycerin-type or glycidol-type surfactant; a cationic surfactant such as a higher alkyl amine, a quaternary ammonium salt, pyridine or other heterocyclic compounds, a phosphonium or a sulfonium; an anionic surfactant such as a carboxylic acid, sulfonic acid, phosphoric acid, or an anionic surfactant containing an acid group such as a sulfuric acid ester group or a phosphoric acid ester group; or an amphoteric surfactant such as an amino acid, an amine sulfonic acid or a sulfuric acid ester or phosphoric acid ester of an amino alcohol.

As the active energy rays to be used for crosslinking of the resins in the back coating layer of the present invention, there may be employed electron beams generated from a radiation accelerator as the source of radiation, $\gamma$-rays generated from $Co^{60}$ as the source of radiation, $\beta$-rays generated from $Sr^{90}$ as the source of radiation, X-rays generated from an X-ray generator as the source of radiation, or ultraviolet rays.

From the viewpoints of the easy control of the absorption dose, the introduction to the production line, or the shielding of ionized radiation, it is particularly advantageous to use the radiation rays from the radiation accelerator as the source of radiation.

With respect to the characteristics of the radiation rays to be used for the curing of the back coating layer, it is preferred, from the aspect of the penetrating power, to irradiate by means of the radiation accelerator having an acceleration voltage of from 100 to 750 KV, or preferably from 150 to 300 KV, at an absorption dose in a range of from 0.5 to 20 Mrad.

For the curing of the back coating layer according to the present invention, a low dose type radiation accelerator (an electron-curtain system) manufactured by Energy Science Co., U.S.A. is extremely advantageous from the viewpoints of its easy introduction into the tape coating process line and the shielding of the secondary X-rays within the accelerator.

Needless to say, it is possible to use a Van de Graaff type accelerator which has so far been used widely as the radiation accelerating apparatus.

Further, for the cross-linking by radiation, it is important to irradiate the backing layer with the radiation rays in an inert gas stream such as nitrogen ($N_2$) gas, helium (He) gas, and so forth. It is extremely disadvantageous to conduct the radiation in the air because $O_3$, etc. generated by the radiation for the cross-linking of the binder components serve to prevent the radicals generated in the polymer from acting advantageously for the cross-linking reaction.

It is therefore important to maintain the atmosphere at a portion where the active energy rays are irradiated to be an inert gas atmosphere such as $N_2$, He or $CO_2$, with the oxygen concentration being as low as 5% at the maximum.

As the magnetic layer of the present invention, there may be employed a coating type composed of a coating layer comprising fine ferromagnetic particles and a binder, or a thin metal film type composed of a thin layer of ferromagnetic metal. As the ferromagnetic material, there may be mentioned $\gamma$-$Fe_2O_3$, $Fe_3O_4$, Co-doped $\gamma$-$Fe_2O_3$, Co-doped$\gamma$-$Fe_2O_3$-$Fe_3O_4$ solid solution, Co compound-adsorbed $\gamma$-$Fe_2O_3$, Co compound-adsorbed $\gamma$-$Fe_3O_4$ (inclusive of an intermediately oxidized state with $\gamma$-$Fe_2O_3$) (the Co compound here is meant for e.g. cobalt oxide, cobalt hydroxide, cobalt ferrite or cobalt ion-adsorbing substance; whereby the magnetic anisotropy of cobalt is utilized for the improvement of the coercive force), or iron, cobalt, nickel, other ferromagnetic metal or a magnetic alloy such as Fe-Co, Fe-Ni, Co-Ni, Fe-Rh, Fe-Cu, Fe-Au, Co-Cu, Co-Au, Co-Y, Co-La, Co-Pr, Co-Gd, Co-Sm, Co-Pt, Ni-Cu, Fe-Co-Nd, Mn-Bi, Mn-Sb or Mn-Al. Further, a ferrite magnetic substance such as Ba ferrite or Sr ferrite may be mentioned.

Heretofore, there have been commonly used as the ferromagnetic powder, for instance, $\gamma$-$Fe_2O_3$, Co-containing $\gamma$-$Fe_2O_3$, $Fe_3O_4$, Co-containing $Fe_3O_4$ or $CrO_2$. However, the magnetic characteristics such as the coercive force and the maximum residual magnetic flux density of these ferromagnetic powders, are inadequate for high sensitivity high density recording, and they are not suitable for use for magnetic recording of a signal having a short recording wavelength of a level of at most about 1 $\mu$m or for the magnetic recording with a narrow track width.

As the requirements for the magnetic recording media have become severe, there have been developments in or proposals for ferromagnetic powders having characteristics suitable for high density recording. Such ferromagnetic powders include metals or alloys such as Fe, Co, Fe-Co, Fe-Co-Ni or Co-Ni, and alloys thereof with Al, Cr or Si. For the purpose of high density recording, the magnetic recording layer using such an alloy powder is required to have a high coercive force and a high residual magnetic flux density. Therefore, it is desirable that various methods for the production or alloy compositions are selected to meet these requirements.

The present inventors have prepared magnetic recording media by employing various alloy powders, and have found that a magnetic recording medium with a noise level being sufficiently low and suitable for high density short wave recording is obtainable when the specific surface area as measured by BET method is at least 48 $m^2/g$, the coercive force of the magnetic layer is at least 1000 Oe, and the surface roughness of the magnetic layer is at most 0.08 $\mu$m as a $R_{20}$ value (an average value of 20 values) with a cut off of 0.17 mm by Talystep method. When such a magnetic layer is combined with the back coating layer of the present invention, the cinching phenomenon (the loosening of the tape winding when the tape has been stopped abruptly) dropouts and abrasion can be reduced. Further, there is a trend that as the base for the magnetic tape, a plastic film made of e.g. polyethylene terephthalate, polyethylene naphthalate, polyimide or polyamide has a thickness as thin as about 11 $\mu$m or less, and accordingly there is an increasing tendency for greater tightening of the tape winding, thus leading to the transfer of the surface roughness of the back coating surface to the magnetic layer and the consequential decrease in the output. Such drawbacks are also overcome by the above-mentioned combination of the magnetic recording later and the back coating layer according to the present invention. Further, when a ferromagnetic metal is used as the major component of the ferromagnetic material, it is likely that the electric resistance of the layer is high, and dropouts are likely to result, and accordingly it is necessary to take a certain antistatic measure. However, such a problem can be solved also by the combination with the back coating layer of the present invention.

The preferred range of the coercive force of the above-mentioned magnetic recording layer is from 1,000 to 2,000 Oe. If the coercive force exceeds this range, the magnetic head tends to be saturated at the time of recording, or it becomes difficult to erase the magnetization. In general, the greater the specific surface area of the magnetic powder, the more the S/N ratio will be improved. However, if the specific surface area is too large, the dispersibility of the magnetic powder into the binder tends to be poor, or the effectiveness tends to be saturated. On the other hand, the surface roughness of the magnetic recording layer affects the recording sensitivity. If the surface roughness is small, the recording sensitivity for a short wavelength will increase.

As a ferromagnetic alloy satisfying the above characteristics, there may be employed a fine powder of Co, Fe-Co, Fe-Co-Ni or Co-Ni, or such a fine powder mixed with Cr, Al or Si. It may be a fine powder obtained by wet-reducing a metal salt with a reducing agent such as $BH_4$, a fine powder obtained by coating the surface of iron oxide with a Si compound and dry-reducing the product in $H_2$ gas, or a fine powder obtained by evaporating an alloy in a low pressure argon atmosphere, and it has an axial ratio of from 1:5 to 1:10 and a residual magnetic flux density Br of from 2,000 to 3,000 gauss, and satisfies the above-mentioned conditions for the coercive force and the surface area.

Various binders may be employed in combination with the alloy magnetic powder to prepare magnetic coating compositions. It is usually preferred to employ a thermosetting resin binder or a radiation curable binder. As other additives, there may be employed a dispersant, a lubricant or an antistatic agent in accordance with the conventional method. Since there is a problem in the dispersibility because of the employment of the magnetic powder having a BET specific surface area of 48 $m^2/g$, it is advisable to employ a surfactant or a- organic titanium coupling agent as the dispersant. As the binder, there may be employed a binder comprising a vinyl chloride-vinyl acetate-vinyl alcohol copolymer, a polyurethane prepolymer and a polyisocyanate, such a binder which further contains nitrocellulose, other known thermosetting binders, or a radiation curable binder containing resin groups such as acrylic double bonds or maleic double bonds sensitive to ionized energy.

In accordance with a usual method, the alloy magnetic powder is mixed with the binder and a predetermined solvent and various additives to prepare a magnetic coating material. The coating material is then coated on a substrate such as a polyester base film and then subjected to thermosetting or radiation curing to form a magnetic layer, and further subjected to calender treatment.

In a case where a radiation curable binder is used for both the magnetic layer and the back coating layer, a continuous curing is possible, and no transfer of the roughness of the rear side to the magnetic layer is likely to take place, whereby dropouts can be prevented. Besides, the radiation curing can be conducted on-line, thus serving for the energy saving and manpower saving for the production, which in turn results in the reduction of the costs. From the properly point of view, it is possible not only to prevent dropouts due to the tightening of the winding during the heat curing operation but also to prevent the difference in the output in the longitudinal direction of the magnetic tape attributable to the difference in the pressure of the respective portions in the direction of radius of the rolled tape. When the base thickness is as thin as 11 $\mu$m or less and the surface hardness of the magnetic layer is small as the hardness of the metal magnetic powder is smaller than the magnetic oxide such as γ-Fe₂O₃, the magnetic recording medium is susceptible to the influence of the tightening of the tape winding. However, by means of the radiation-cured back coating layer, this adverse effect can be eliminated, and the output difference as between the outside and the inside of the wound tape, or the difference in the dropouts can be eliminated. Thus, it is particularly preferred to employ a radiation curable binder for the back coating layer.

In addition to the a above combination, a combination of the back coating layer of the present invention with a thin ferromagnetic metal film as the magnetic recording layer provides excellent electromagnetic conversion characteristics and good surface roughness and serves to prevent curling and minimize the dropouts.

To the magnetic layer and the back coating layer of the present invention, there may be incorporated various antistatic agents, lubricants, dispersants, sensitizers, leveling agents, friction resistance-imparting agents, coating layer-reinforcing agents, etc., which are commonly used for the magnetic recording media. If the back coating layer contains no lubricant, the friction during the high temperature running becomes high, and the flickering of the image tends to be led. Thus, jitters are likely to result.

In the formation of a thermosetting-type back coating layer in the production of a magnetic recording medium if the back coating layer is formed prior to the formation of the magnetic layer, the thermosetting treatment of the back coating layer tends to lower the surface roughness of the base surface due to the tightening with the base. For this reason, the thermosetting treatment used to be conducted after the formation of the magnetic layer. Therefore, the back coating treatment is usually applied to the rear side of the substrate after the formation of the magnetic layer on the substrate. Whereas, in the present invention, a radiation curable binder is used, and no tightening will be brought about by the formation of the back coating layer, and accordingly there is no particular problem as to which layer is formed first.

As magnetic recording media o- which the back coating layer of the present invention may be formed, there may be mentioned audio tapes, video tapes, computer tapes, endless tapes or magnetic discs. It is particularly effective to use the back coating layer of the present invention for video tapes and computer types in which the dropouts are one of the most important problems to be solved.

In recent years, there have been remarkable technical and commercial developments in the field of highly biased HiFi audio cassette tapes, video cassette tapes and master tapes for contact transfer printing of video tapes. For such tapes, the combination of the back coating layer of the present invention wherein a radiation curable binder is employed, with a cobalt-modified acicular iron oxide (a cobalt-doped type or a cobalt compound-adsorbed type) which is particularly advantageous for high density recording among the above fine magnetic powders, or fine acicular alloy particles or a thin metal film having even higher coercive forces, is particularly effective to obtain a high performance tape having extremely good electromagnetic conversion characteristics and physical dependabilities. Thus, the resin composition of the present invention is an excellent resin composition which is very useful.

Now, the present invention will be described with reference to Examples. However, it should be understood that the present invention is by no means restricted by these specific Examples.

EXAMPLE 1

Formation of Magnetic Layers

Magnetic layer 1 (thermosetting-type magnetic layer)

|  | Parts by weight |
|---|---|
| Cobalt-adsorbed acicular γ-Fe₂O₃ (long axis: 0.4 μm, short axis: 0.05 μm, Hc: 600 Oe) | 120 |
| Carbon black (antistatic Mitsubishi Carbon Black MA-600) | 5 |
| α-Al₂O₃ powder (particle size: 0.5 μm) | 2 |
| Dispersant (purified soybean lecithin) | 3 |
| Solvent (MEK/toluene: 50/50) | 100 |

The mixture having the above composition was mixed in a ball mill for 3 hours to adequately wet the acicular magnetic iron oxide with the dispersant.

Then, the following mixture is thoroughly mixed and dissolved.

|  | Parts by weight |
|---|---|
| Vinyl chloride-vinyl acetate copolymer (VAGH, manufactured by Union Carbide Co.) | 15 |
| Thermoplastic urethane resin (Nippolan 3022, manufactured by Nippon Polyurethane Industry Co.) | 15 |
| Solvent (MEK/toluene: 50/50) | 200 |
| Lubricant (higher fatty acid-modified silicone oil) | 3 |

The mixture thus obtained was introduced into the ball mill where the magnetic powder was treated, and the mixture was dispersed again for 42 hours. After the dispersing, 5 parts by weight (as solid content) of an isocyanate compound (Desmodule L, manufactured by Bayer AG) reactive and cross linkable with functional groups composed mainly of hydroxyl groups of the binder in the magnetic coating material, was mixed with the above coating material in the ball mill for 20 minutes.

The magnetic coating material thus prepared was applied onto a polyester film having a thickness of 15 μm, oriented on a parmanent magnet (1600 gauss), and the solvent was evaporated by means of an infrared lamp or hot air. Then, the coated film was subjected to surface smoothing treatment, and then kept in a rolled state in an oven maintained at 80° C. to promote the cross linking reaction by the isocyanate.

Magnetic layer 2 (radiation curable magnetic layer)

|  | Parts by weight |
|---|---|
| Cobalt-adsorbed acicular γ-Fe₂O₃ (long axis: 0.4 μm, short axis: 0.05 μm, Hc: 600 Oe) | 120 |
| Carbon black (antistatic Mitsubishi Carbon Black MA-600) | 5 |
| α-Al₂O₃ powder (particle size: 0.5 μm) | 2 |
| Dispersant (purified soybean lecithin) | 3 |
| Solvent (MEK/toluene: 50/50) | 100 |

The mixture having the above composition was mixed in a ball mill for 3 hours to adequately wet the acicular magnetic iron oxide with the dispersant.

Then, the following binder composition was thoroughly mixed and dissolved.

|  | Parts by weight |
| --- | --- |
| Acrylic double bond-introduced saturated polyester resin (method (c)) | 10 (as solid content) |
| Acrylic double bond-introduced vinyl chloride-vinyl acetate copolymer (method (a)) | 10 (as solid content) |
| Acrylic double bond-introduced polyether urethane elastomer (method (f)) | |
| Solvent (MEK/toluene: 50/50) | 200 |
| Lubricant (higher fatty acid-modified silicone oil) | 3 |

The binder mixture was introduced into the ball mill wherein the magnetic powder was previously treated, and the mixture was again mixed and dispersed for 42 hours.

The magnetic coating material thus obtained was applied onto a polyester film having a thickness of 15 μm, and oriented on a parmanent magnet (1600 gauss). After evaporating the solvent by means of an infrared lamp or hot air, the coated film was subjected to surface smoothing treatment, and then electron beams were irradiated by means of an electro curtain-type electron beam accelerator manufactured by ESI Company at an acceleration voltage of 150 KeV at an electrode current of 20 mA and at a total dose of 5 Mrad in a nitrogen atmosphere, to cure the coating layer.

The tape thereby obtained was cut into a video tape having a width of ½ inch.

Formation of Back Coating Layers

Back coating layer 1

|  | Parts by weight |
| --- | --- |
| Carbon black (particle size: 100 mμm, manufactured by Asahi Carbon Co. Ltd.) | 50 |
| (A) Acryl-modified vinyl chloride vinyl acetate-vinyl alcohol copolymer (method (a)) having a molecular weight of x | 40 |
| (B) Acryl-modified polyurethane elastomer (method (e)) having a molecular weight of y | 20 |
| (C) Polyfunctional acrylate or acryl-modified polyurethane elastomer having a molecular weight of z | 20 |
| Stearic acid | 2 |
| Butyl stearate | 2 |
| Solvent (MIBK/toluene = 1/1) | 300 |

The mixture having the above composition was dispersed in a ball mill for 5 hours, and then applied onto the rear side of the polyester film on which the magnetic layer was previously formed, in a dry thickness of 2 μm. Then, electron beams were applied to the back coating layer by means of an electro curtain-type electron beam accelerator at an acceleration voltage of 150 KeV at an electrode current of 10 mA and at an absorption dose of 5 Mrad in a nitrogen gas atmosphere for curing, and the film was wound up. Then, the film was cut into a video tape having a width of ½ inches, and the dropouts were measured by means of a VHS deck.

Back coating layer 2

|  | Parts by weight |
| --- | --- |
| CaCO₃ (particle size: 80 mμm) | 50 |
| Acryl-modified vinyl chloride-vinyl acetate-vinyl alcohol copolymer (method (a)) having a molecular weight of 30,000 | 30 |
| Acryl-modified polyurethane elastomer (method (e)) having a molecular weight of 50,000 | 30 |
| Acryl-modified polyurethane elastomer (method (e)) having a molecular weight of 1,000 | 20 |
| Polyfunctional acrylate having a molecular weight of 500 | 20 |
| Stearic acid | 4 |
| Solvent mixture (same as 1) | 300 |

The above mixture was treated in the same manner as the preparation of back coating layer 1.

Back coating layer 3

|  | Parts by weight |
| --- | --- |
| Carbon black (average particle size: 20 mμm) | 60 |
| Phenoxy-modified compound having a molecular weight of 30,000 | 25 |
| Acryl-modified polyurethane elastomer (method (e)) having a molecular weight of 20,000 | 10 |
| Acryl-modified polyester resin (method (c)) having a molecular weight of 10,000 | 10 |
| Polyfunctional acrylate having a molecular weight of 500 | 5 |
| Myristic acid | 2 |
| Solvent mixture | 300 |

The above mixture was treated in the same manner as back coating layer 1.

Back coating layer 4

|  | Parts by weight |
| --- | --- |
| CaCO₃ (particle size: 50 mμm) | 30 |
| Carbon black (particle size: 80 mμm) | 10 |
| TiO₂ (particle size: 200 mμm) | 20 |
| Acryl-modified polyurethane elastomer (method (e)) having a molecular weight of 70,000 | 30 |
| Butyral-modified compound (method (b)) having a molecular weight of 40,000 | 50 |
| Acryl-modified polyurethane elastomer (method (e)) having a molecular weight of 1,000 | 20 |
| Lauric acid | 4 |
| Solvent mixture | 300 |

The above mixture was treated in the same manner as the back coating layer 1.

In the combination of the magnetic layer 2 with the back coating layer 1, the molecular weights of compounds (A), (B) and (C) in the back coating layer 1 were varied to see the effects of the present invention. The results are shown in Table 1.

TABLE 1

| (A) | Molecular weight | 5,000 |
| --- | --- | --- |

TABLE 1-continued

| (B) Molecular weight | | | 3,000 | | | 5,000 | 10,000 | 80,000 | 100,000 | 150,000 |
|---|---|---|---|---|---|---|---|---|---|---|
| (C) Molecular weight | — | 100 | 200 | 1,000 | 2,500 | 500 | 500 | 500 | 500 | 500 |
| Adhesion of the back coating Kept at 50° C. under a relative humidity of 80% for 5 days | X | X | ○ | ○ | ○ | ⊙ | ⊙ | ⊙ | ○ | X |
| Adhesiveness | X | ○ | ⊙ | ⊙ | ⊙ | ⊙ | ⊙ | ⊙ | ○ | X |
| Static-dynamic friction (g) | 200 | 250 | 50 | 40 | 50 | 50 | 30 | 30 | 55 | 150 |
| Flickering of the image | Great | Great | Slight | Slight | Slight | Slight | None | None | Slight | Medium |
| D.O. | 500 | 450 | 30 | 30 | 30 | 50 | 20 | 25 | 50 | 550 |
| Lapping | 5 | 5 | 10< | 10< | 10< | 10< | 10< | 10< | 10< | 10< |
| Brittleness energy % | 30 | 40 | 70 | 70 | 75 | 75 | 100 | 100 | 80 | 30 |
| Electromagnetic conversion characteristics | 0.5 | 0.5 | 0.4 | 0.4 | 0.4 | 0.4 | 0.2 | 0.2 | 0.2 | 0.6 |
| Scars | X | Δ | ○ | ○ | ○ | ○ | ○ | ○ | ○ | X |

| (A) Molecular weight | 10,000 | 20,000 | 40,000 | 80,000 | | 100,000 | | | |
|---|---|---|---|---|---|---|---|---|---|
| (B) Molecular weight | 10,000 | 10,000 | 10,000 | 10,000 | | 10,000 | | | |
| (C) Molecular weight | 500 | 500 | 500 | 500 | — | 100 | 200 | 1,000 | 2,500 |
| Adhesion of the back coating Kept at 50° C. under a relative humidity of 80% for 5 days | ⊙ | ⊙ | ⊙ | ⊙ | X | ○ | ○ | ○ | ○ |
| Adhesiveness | ⊙ | ⊙ | ⊙ | ⊙ | X | ○ | ⊙ | ○ | ○ |
| Static-dynamic friction (g) | 35 | 30 | 30 | 30 | 200 | 55 | 40 | 55 | 55 |
| Flickering of the image | Slight | None | None | None | Great | Slight | Slight | Slight | Slight |
| D.O. | 45 | 30 | 30 | 30 | 400 | 50 | 30 | 50 | 50 |
| Lapping | 10< | 10< | 10< | 10< | 1 | 10< | 10< | 10< | 10< |
| Brittleness energy % | 100 | 150 | 150 | 150 | 30 | 70 | 80 | 80 | 80 |
| Electromagnetic conversion characteristics | 0.2 | 0 | 0 | 0 | 0.4 | 0.3 | 0.2 | 0.2 | 0.3 |
| Scars | ○ | ⊙ | ⊙ | ⊙ | Δ | ○ | ○ | ○ | ○ |

Notes:
D.O. means dropouts (number/min)
Lapping test indicates a number of times
Electromagnetic conversion characteristics are Y-S/N dB
Scars mean scars on the back coating surface caused by abrupt stopping It is evident from Table 1 that when the molecular weight of compound (B) is less than 3000, the coating layer tends to be hard, and the abrasion of the back coating layer and the deterioration of the electromagnetic conversion characteristics are observed, whereas when the molecular weight exceeds 100,000, the radiation curability tends to decrease, and the dispersibility becomes poor, whereby the electro-magnetic conversion characteristics tend to deteriorate; and when the molecular weight of compound (C) s less than 200, the coating layer tends to be hard (brittle), whereby the brittleness energy tends to decrease, the back coating layer becomes susceptible to abrasion, adhesiveness appears due to the low molecular component, the coating layer is susceptible to peeling by the lapping test because the coating layer is brittle, and scars are likely to result by abrupt stopping. In both cases, there is observed a substantial increase in the dropouts after the running test.

Samples of various combinations of the above magnetic layers with the back coating layers were subjected to various property tests. The results are shown in Table 2.

TABLE 2

| | Sample No. | | | | | |
|---|---|---|---|---|---|---|
| | 1 | 2 | 3 | 4 | 5 | 6 |
| Characteristics | | | | | | |
| Magnetic layer | 1 | 1 | 1 | 2 | 2 | 2 |
| Back coating layer | 2 | 3 | 4 | 2 | 3 | 4 |
| Abrasion of the back coating layer | ⊙ | ⊙ | ⊙ | ⊙ | ⊙ | ⊙ |
| Kept at 50° C. under a relative humidity of 80% | ⊙ | ⊙ | ⊙ | ⊙ | ⊙ | ⊙ |
| Adhesiveness | | | | | | |
| Static-dynamic friction (g) | 30 | 35 | 30 | 35 | 30 | 30 |
| Flickering of the image | None | None | None | None | None | None |

TABLE 2-continued

|  | Sample No. | | | | | |
| --- | --- | --- | --- | --- | --- | --- |
|  | 1 | 2 | 3 | 4 | 5 | 6 |
| Dropouts (number/min) Initial | 50 | 50 | 55 | 30 | 30 | 25 |
| Lapping test (time) | 10< | 10< | 10< | 10< | 10< | 10< |
| Brittleness energy (%) | 140 | 110 | 150 | 140 | 110 | 150 |
| Electromagnetic conversion characteristics Y-S/N dB | −0.4 | −0.3 | −0.3 | +0.1 | 0 | +0.1 |
| Scars formed by abrupt stopping | ⊙ | ⊙ | ⊙ | ⊙ | ⊙ | ⊙ |

With respect to Example 1, the results shown in Tables 1 and 2 will be discussed.

a. When compound (A) has a molecular weight of 4,000

Substantial abrasion of the back coating layer is observed, and the friction after the running is high. Since the molecular weight is low, the coating layer has poor elasticity and low brittleness energy and breaking energy. Accordingly, the tightening of the tape winding is great when kept at 50° C. under a relative humidity of 80%.

b. When compound (A) has a molecular weight of 5,000

When compound (B) has a molecular weight of at most 3,000, the results are the same as above (a).

When compound (B) has a molecular weight of at least 3,000:

If compound (C) is a polyfunctional acrylate having a molecular weight of 100, the abrasion of the back coating layer is great, the change in the static-dynamic friction after the high temperature storage is great, the flickering of the image is great, and the dropouts are great. The coating layer is susceptible to peeling by the lapping test (5 times) and brittle. Accordingly, the brittleness energy is small. Further, the coating layer is hard, and when the tape is stopped abruptly, scars are likely to form on the back coating surface.

These problems have been solved when compound (C) is a polyfunctional acrylate having a molecular weight of 200, or a radiation curable urethane elastomer having a molecular weight of 1,000 or 2,500.

When compound (B) has a molecular weight of at least 150,000:

This is a high molecular weight urethane elastomer, and accordingly the hardness is low, adhesiveness appears, and the abrasion of the back coating layer is substantial. The brittleness energy is small. Accordingly, the electromagnetic conversion characteristics are poor, and scars on the back coating surface caused by abrupt stopping are substantial.

c. When the molecular weights of compounds (A), (B) and (C) are combined to be from 5,000 to 100,000 for (A), from 3,000 to 100,000 for (B) and from 200 to 3,000 for (C), a coating layer is obtained which shows no adhesiveness when kept at 50° C. under a relative humidity of 80% and in which the change of the static-dynamic friction is small, no flickering of the image is observed, the dropouts are minimum, the solvent resistance by the lapping test is excellent, the brittleness energy is great, the decrease of the electromagnetic conversion characteristics is minimum and scars are hardly formed on the back coating layer by the abrupt stopping.

Within the above molecular weight ranges, preferred are from 10,000 to 80,000, more preferably from 20,000 to 80,000 for (A), from 3,000 to 80,000 for (B) and from 200 to 2,500 for (C). Within these preferred ranges, the above characteristics can further be improved.

EXAMPLE 2

Several alloy magnetic layers were formed as described hereinafter, and these magnetic layers were combined with the back coating layers of Example 1 to prepare magnetic recording media.

Then, the effects of the present invention were investigated.

Formation of Magnetic Layers

By means of a wet reduction method, various alloy powders were prepared. These powders were composed of acicular particles having an axial ratio (short axis/long axis of from 1/5 to 1/10 and had a residual magnetic flux density of from 2,000 to 3,000 gauss, a coercive force of from 1,000 to 2,000 Oe and a BET specific surface area of from 45 to 70 $m^2/g$. These magnetic powders were mixed in the following proportions in the usual manner, and the respective magnetic layers were formed.

Magnetic layer 3 (thermosetting type)

|  | Parts by weight |
| --- | --- |
| Fe—Co—Ni alloy powder (Hc = 1200 Oe, long axis: 0.4 μm, short axis: 0.05 μm, BET specific surface area: 52 $m^2/g$) | 100 |
| Vinyl chloride-vinyl acetate-vinyl alcohol copolymer (VAGH, manufactured by Union Carbide Co.) | 15 |
| Polyurethane prepolymer (Desmodule 22, manufactured by Bayer AG) | 10 |
| Methyl ethyl ketone/toluene (1/1) | 250 |
| Myristic acid | 2 |
| Sorbitan stearate | 2 |

To the above mixture, 30 parts by weight of a polyisocyanate (desmodule L, manufactured by Bayer AG) was added to obtain a magnetic coating material, which was then applied onto a polyester film in a thickness of 3.5 μm and then subjected to calender treatment.

Magnetic layer 4 (radiation curable type)

By using the same magnetic alloy powder and substrate as for the magnetic layer 3, the following mixture was applied onto a polyester film in a thickness of 3.5 μm, followed by electron beam curing and calender treatment.

|  | Parts by weight |
| --- | --- |
| Fe—Co—Ni alloy powder | 100 |
| Vinyl chloride-vinyl acetate-vinyl alcohol copolymer (VAGH, manufactured by Union Carbide Co.) | 15 |
| Polyvinyl butyral resin (method (b)) | 10 |
| Acrylic double bond-introduced urethane (method (e)) | 10 |

-continued

| | Parts by weight |
|---|---|
| Methyl ethyl ketone/toluene (50/50) | 250 |

Magnetic layer 5 (radiation curable type)

In the same manner as the preparation of the magnetic layer 4, a magnetic layer was prepared by using the following composition.

| | Parts by weight |
|---|---|
| Fe—Co—Ni alloy powder (BET: 60 m²/g) | 100 |
| Saturated polyester resin | 5 |
| Acrylic introduced vinyl chloride-vinyl alcohol copolymer (polymerization degree 300) (method (a)) | 10 |
| Acrylic double bond-introduced polyether urethane elastomer (method (f)) | 10 |
| Solvent mixture (same as the magnetic layer 3) | 250 |

These magnetic layers 1 to 3 were appropriately combined with the back coating layers of Example 1, and magnetic recording media were prepared by changing the order of their formation. However, in this Example, calender treatment was conducted each time when each layer was formed. The results of the property tests are shown in Table 3.

(A), (B) and (C) is particularly remarkable in the case where the magnetic powder is an alloy powder.

The surface roughness of the video tape in group D ((1) magnetic layer 4, and (2) back coating layer 3) in Table 3 was studied. FIG. 1 shows the S/N ratio (relative value) in a case where the video tape was driven at a speed of 3.8 m/sec and recording and reproduction were conducted at a major frequency of 5 MHz. The numbers allotted to the curves indicate the surface roughness of the magnetic layers. It is evident from FIG. 1 that the S/N ratio can be kept at a high level when the surface roughness of the magnetic layer is at most 0.08 μm and the surface roughness of the back coating layer is at most 0.6 μm. The same applies to other combinations.

Figure 2:
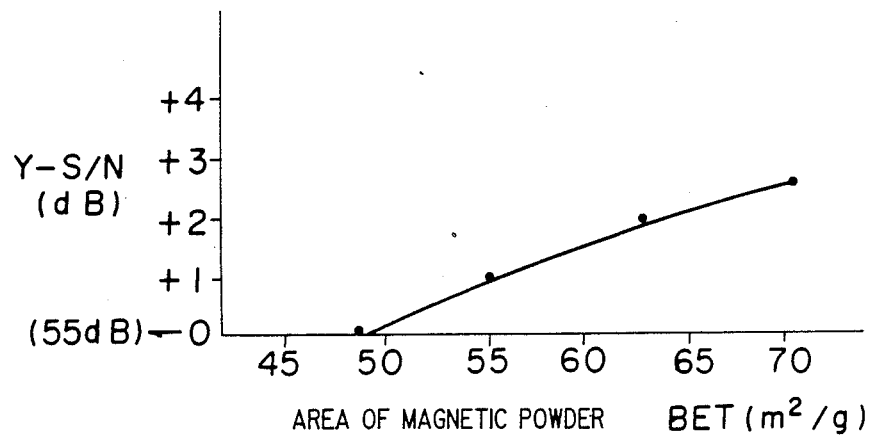
FIG. 2 is a graph showing the relation between the BET specific surface area of a alloy magnetic powder and the S/N ratio.

With respect to the above video tape, the relation between the BET specific surface area of the alloy powder and the S/N ratio within the range wherein the surface roughness of the magnetic layer is at most 0.08 μm and the surface roughness of the back coating layer is from 0.05 to 0.6 μm, was investigated whereby the results as shown in FIG. 2 were obtained. In this case, 55 dB was used as the reference. It is evident from FIG. 2 that excellent characteristics are obtainable when the BET value is at least 48 m²/g. The same applies to other combinations.

Further, the tightening of the tape winding was measured. Satisfactory results were obtained in all cases when tested at a temperature of 40° C. under a relative humidity of 80%.

TABLE 3

| | Magnetic surface | Back coating surface | Abrasion of B-surface | S.G. | Abrasion of M-surface | Adhesiveness | Static-dynamic | L.P. | D.O. | Y-S/N (dB) Outer side | Y-S/N (dB) Inner side | E' Kg/mm² | Scars |
|---|---|---|---|---|---|---|---|---|---|---|---|---|---|
| A | (1) Magnetic layer 3 | (2) Back coating layer 1 | ◉ | ◉ | ◉ | ◉ | 30 | >10 | 80 | +0.0 | −0.3 | 700 | ◉ |
| | (2) Magnetic layer 3 | (1) Back coating layer 1 | ◉ | ◉ | ◉ | ◉ | 30 | >10 | 80 | +0.0 | +0.1 | 700 | ◉ |
| B | (1) Magnetic layer 4 | (2) Back coating layer 2 | ◉ | ◉ | ◉ | ◉ | 25 | >10 | 30 | +0.0 | +0.6 | 1300 | ◉ |
| C | (2) Magnetic layer 4 | (1) Back coating layer 2 | ◉ | ◉ | ◉ | ◉ | 30 | >10 | 30 | +0.0 | +0.6 | 1300 | ◉ |
| D | (1) Magnetic layer 4 | (2) Back coating layer 3 | ◉ | ◉ | ◉ | ◉ | 30 | >10 | 30 | +0.6 | +0.6 | 1300 | ◉ |
| | (2) Magnetic layer 4 | (1) Back coating layer 4 | ◉ | ◉ | ◉ | ◉ | 25 | >10 | 30 | +0.6 | +0.6 | 1300 | ◉ |
| | (2) Magnetic layer 5 | (1) Comparative back coating layer | ◉ | Δ | ◉ | ◉ | 25 | >10 | 100 | +0.6 | +0.6 | 1300 | ◉ |
| Comparative | (1) Magnetic layer 2 | (2) * | X | X | ◉ | X | | | 60 | 600 | +0.6 | +0.2 | ◉ | X |

Notes:
B-surface means the back coating surface; S.G. means cinching; M-surface means the magnetic layer surface; L.P. means a lapping test; D.O. means dropouts (initial, number/min); E' means Young's modulus of elasticity; scars means scars formed on the back coating surface as a result of abrupt stopping. The adhesiveness, static-dynamic (static-dynamic friction change (g)), lapping test and dropouts were measured with respect to test samples kept at 50° C. under a relative humidity of 80% for 5 days. For the back coating layer 1, compounds (A), (B) and (C) having molecular weights of 40,000, 10,000 and 500, respectively, were employed.
In the comparative back coating layer, a non-modified polyurethane elastomer N3119 was employed for the back coating layer 1. * means a back coating layer wherein the molecular weight of compound (B) is 3,000 and compound (C) is a polyfunctional acrylate having a molecular weight of 100 as shown in Table 2.
◉ indicates excellent; ◯ indicates good, Δ indicates fair and X indicates no good.

Referring to Table 3, from the comparison within group A, it is evident that when the back coating layer is formed first, the substrate surface is reinforced, whereby the transfer of the rear surface to the magnetic layer surface is minimum, and the difference in the electromagnetic conversion characteristics as between the inside and the outside of the jumbo roll is minimum. In the cases where both the magnetic layer and the back coating layer are made of a radiation curable type as shown by groups B to D, there is no difference whichever layer is formed first. From Example 3, it is evident that the effectiveness of the combination of compounds

EXAMPLE 3:

A Co-Ni alloy (Hc: 1,100 Oe) was vapor-deposited by vacuum vapor deposition on one side of a polyethylene terephthalate base film having a thickness of 10 μm to form a thin magnetic layer having an average thickness of 0.2 μm.

On the rear side of the substrate on which the magnetic recording layer composed of a thin metal film was thus formed, the back coating layer 1 to 5 of Example 1 was applied in a drY thickness of 1.0 μm, then dried and calendered for surface smoothing treatment. Then, electron beams were irradiated onto the back coating layer by means of an electro curtain type electron beam accelerator at an acceleration voltage of 150 KeV at an electrode current of 10 mA and an absorption dosage of 3 Mrad in a nitrogen gas atmosphere, whereby the back coating layer was cured. The magnetic tapes thereby obtained were tested for various characteristics. The test results are shown in Table 4.

By means of a commercially available VHS system VTR, the tape was permitted to run 100 times at 40° C. under a relative humidity of 60%, whereupon the scars on the back coating surface were observed. Symbol ⊙ indicates that no stain was observed, and symbol × indicates that substantial stains were observed.

3. Adhesion between the magnetic layer and the back coating layer

The tape was wound up on a VHS reel and left to stand at 60° C. under a relative humidity of 40% for 5 days, whereupon the state of the adhesion was visually

TABLE 4

| | Sample No. | | | | | |
|---|---|---|---|---|---|---|
| | 1 | 2 | 3 | 4 | 5 | * |
| Characteristics | | | | | | |
| Magnetic layer | | | Thin metal film | | | |
| Back coating layer | 1 | 2 | 3 | 4 | 5 | Comparative |
| Running durability | | | | | | |
| Winding appearance | ⊙ | ⊙ | ⊙ | ⊙ | ⊙ | Δ |
| Abrasion of the back coating layer | ⊙ | ⊙ | ⊙ | ⊙ | ⊙ | X |
| Adhesion to guide poles during running | ⊙ | ⊙ | ⊙ | ⊙ | ⊙ | X |
| Electromagnetic conversion characteristics Y-S/N dB | | | | | | |
| Outside | +0.6 | +0.5 | +0.5 | +0.6 | +0.7 | +0.6 |
| Inside | +0.6 | +0.6 | +0.6 | +0.6 | +0.7 | −0.1 (unstable) |
| Curling | ⊙ | ⊙ | ⊙ | ⊙ | ⊙ | ⊙ |
| Static-dynamic friction change (g) | 40 | 35 | 40 | 40 | 40 | 300 |
| Kept at 50° C. under a relative humidity of 80% | | | | | | |
| Adhesiveness | ⊙ | ⊙ | ⊙ | ⊙ | ⊙ | X |
| D.O. (number/min) Initial | 35 | 30 | 35 | 40 | 35 | 400 |
| Lapping test Time | >10 | >10 | >10 | >10 | >10 | 6 |

Notes:
The "comparative" is the same as the comparative back coating layer in Table 3, and * is the same as the * in Table 3.
Y-S/N is a relative value based on a reference sample wherein the back coating layer was composed of a thermosetting type vinyl chloride-vinyl acetate-vinyl alcohol copolymer, nitrocellulose and polyureythane elastomer (outside: +0.0 dB, inside: −1.2 dB).

In the case of the vapor deposited tape, the vapor-deposited film is very thin, and the influence over the difference between the inside and outside of the jumbo roll is remarkable. In the case of thermosetting, the difference between the outside and the inside of the roll is great due to the transfer of the rear surface to the magnetic layer surface. Particularly, the tape located inside of the roll was useless. In the case of *, component (C) has a low molecular weight, and therefore the coating layer is brittle and adhesion occurred inside. The magnetic conversion characteristics at the inside portion were measured to be −0.1 dB, but were unsatisfactory as being unstable. In the Table, Y-S/N is a relative value based on the thermosetting composition of the back coating layer.

The above-mentioned various characteristics were measured as follows.

(1.) Cinching phenomenon and winding appearance

By means of a commercially available VHS system VTR, a tape was fast forwarded for the entire length and then fast rewound and stopped when the rest of the length was 50 m, and then fast rewound to the end of the tape. Then, the winding condition of the tape was visually observed. Good winding where no space was observed in the tape winding, was designated by ○ or ⊙ (excellent), and inferior winding where a space was observed in the tape winding was designated by ×.

2. Abrasion of the back coating layer evaluated. The case wherein no adhesion was observed was designated by ○, and the case where the adhesion was designated by ×, and the case where the adhesion was observed was designated by ×.

4 Static-dynamic friction change

A tape was cut out and put around a polished aluminum cylindrical pole with the back coating layer located inside, whereby the change of the static friction ($T_1$) and the dynamic friction ($T_2$) was measured. Further, the formation of scars was thereby observed.

5. Brittleness energy

Back coating layer 1 wherein the molecular weights of compounds (A), (B) and (C) were 10,000, 10,000 and 500, respectively, was taken as a standard of 100%. On the basis of the standard, the energy of other samples was shown by percentage. The measurement was conducted at 20° C. under a relative humidity of 60% by means of autograph, manufactured by Shimadzu Corporation.

6. Young's modulus of elasticity

The Young's modulus was measured at 20° C. by an elasticity spectro meter (Iwaki Seisakusho, Toyo Boardwin, Toyo Seikosha).

7. Dropouts

By using a VHS deck at 20° C. under a relative humidity of 60%, a single signal of 4 MHz was recorded and reproduced, whereby a number of samples wherein the reproduced signal lowers by at least 18 dB from the average reproduced level for at least 15 micro seconds, were counted with respect to 10 samples for 1 minute each, and the average number was taken as dropouts. The dropouts prior to the running test of the magnetic tape (initial) and the dropouts after 100 runs were measured.

8. Surface roughness

The surface roughness was obtained by 20 point average method from the chart obtained by means of Talystep (manufactured by TAYLOR-HOBSON CO.). A cut off of 0.17 mm and a needle-pressure of $0.1 \times 2.5$ μ were employed.

9. Electromagnetic conversion characteristics

The S/N ratio (relative value) was shown as recorded and reproduced at a major frequency of 5 MHz. A VTR of VHS was modified so that it was capable of measuring upto 5 MHz.

10. Electron microscopic method (a) The average particle size was measured by a transmission electron microscope by selecting a sample from each tape.

(b) A cross sectional photographic method by means of a scanning type electron microscope. In this case, it happens that particles are coagulated, and if the irregularity of the particle size is great, the minimum particle size is taken as an average particle size.

11. Frictional coefficient

A magnetic tape was put around a polished aluminum cylinder having a diameter of 4 mm at an angle of 180° C. so that the back coating layer is located inside, and permitted to run at a speed of 2 cm/sec, whereby the tensions at the dispensing side and at the winding-up side were measured, and the frictional coefficient was obtained by calculation from the measured values.

12. Lapping test

The back coating surface was brushed with a brush impregnated with methyl ethyl ketone, and a number of times is measured when the back coating surface is dissolved or peeled.

13. Storage test

The tape was stored at 50° C. under a relative humidity of 80% for 5 days and then taken out. Then, (1) adhesiveness, (2) the difference between the static friction at the initiation of the running and the dynamic friction during the regular running operation (static-dynamic), (3) flickering of the image of the recorded tape and (4) dropouts were measured.

We claim:

1. A magnetic recording medium comprising a substrate, a magnetic recording layer formed on one side of the substrate and a back coating layer formed on the other side of the substrate, wherein the binder of the back coating layer is a radiation-curable resin composition comprising:

(A) a plastic compound having a molecular weight of from 5,000 to 100,000 and containing at least two radiation-curable double bonds;

(B) a thermoplastic elastomer or prepolymer having a molecular weight of from 3,000 to 100,000 and containing at least one radiation-curable double bond or containing no such double bond; and (C) a compound having a molecular weight of from 200 to 3,000 and containing at least one radiation-curable double bond, and wherein the magnetic recording layer is composed essentially of a ferromagnetic alloy powder dispersed in a resin binder and having a surface area of at least 48 $m^2/g$ as measured by BET method, and has a coercive force of at least 1000 Oe and a surface roughness of at most 0.08 μm.

* * * * *